United States Patent
Reddy et al.

(10) Patent No.: US 11,960,723 B2
(45) Date of Patent: Apr. 16, 2024

(54) METHOD AND SYSTEM FOR MANAGING MEMORY ASSOCIATED WITH A PERIPHERAL COMPONENT INTERCONNECT EXPRESS (PCIE) SOLID-STATE DRIVE (SSD)

(71) Applicant: SAMSUNG ELECTRONICS CO., LTD., Suwon-si (KR)

(72) Inventors: Krishna Kanth Reddy, Karnataka (IN); Dileep Kumar Sharma, Karnataka (IN); Neeraj Kumar, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 17/867,742

(22) Filed: Jul. 19, 2022

(65) Prior Publication Data
US 2023/0384934 A1 Nov. 30, 2023

(30) Foreign Application Priority Data
May 27, 2022 (IN) .............................. 202241030412

(51) Int. Cl.
*G06F 3/06* (2006.01)
*G06F 12/02* (2006.01)

(52) U.S. Cl.
CPC ............ *G06F 3/061* (2013.01); *G06F 3/0631* (2013.01); *G06F 3/064* (2013.01); *G06F 3/0655* (2013.01);
(Continued)

(58) Field of Classification Search
None
See application file for complete search history.

(56) References Cited

U.S. PATENT DOCUMENTS

| 6,760,826 B2 * | 7/2004 | Ozdemir | G06F 12/023 711/170 |
|---|---|---|---|
| 2005/0273568 A1 * | 12/2005 | Blandy | G06F 12/023 711/170 |

(Continued)

OTHER PUBLICATIONS

Berger et al. "Hoard: A Scalable Memory Allocator for Multithreaded Applications." Nov. 2000. ACM. ASPLOS 2000. pp. 117-128.*

(Continued)

*Primary Examiner* — Nathan Sadler
(74) *Attorney, Agent, or Firm* — F. Chau & Associates, LLC (57) ABSTRACT

A method for managing a memory associated with PCIe SSD including: generating memory pools of equal size from a predefined size of contiguous physical memory, each of the memory pools manages a memory request of different size and is associated with a respective predefined size of memory request; dividing each of the memory pools into first set of memory pages, each having a size equal to maximum size among the predefined size of the memory request associated with the respective memory pool; dividing each of the first set of memory pages into second set of memory pages, each having a size equal to the predefined size of the memory request associated with respective memory pool; and managing the contiguous physical memory by allocating a memory page from the second set of memory pages fora memory request corresponding to the size of the second set of memory pages.

20 Claims, 5 Drawing Sheets

(52) U.S. Cl.
CPC ........ *G06F 3/0679* (2013.01); *G06F 12/0246* (2013.01); *G06F 2212/7202* (2013.01)

(56) References Cited

U.S. PATENT DOCUMENTS

| | | | |
|---|---|---|---|
| 2011/0314246 A1* | 12/2011 | Miller | G06F 3/0604 711/170 |
| 2016/0335198 A1* | 11/2016 | Vogan | G06F 12/128 |
| 2018/0046374 A1* | 2/2018 | Marathe | G06F 3/061 |

OTHER PUBLICATIONS

Leite et al. "LRMalloc: A Modern and Competitive Lock-Free Dynamic Memory Allocator." 2019. Springer. VECPAR 2018. pp. 230-243.*

Baoyue Yan. "Enabling Efficient Slab-based Allocator on Fast NVMe SSD." Mar. 2022. IEEE. CACML 2022. pp. 361-366.*

* cited by examiner

METHOD AND SYSTEM FOR MANAGING MEMORY ASSOCIATED WITH A PERIPHERAL COMPONENT INTERCONNECT EXPRESS (PCIE) SOLID-STATE DRIVE (SSD)

CROSS-REFERENCE TO RELATED APPLICATION

This U.S. non-provisional patent application claims priority under 35 U.S.C. § 119 to Indian Patent Application No. 202241030412, filed on May 27, 2022, in the Korean Intellectual Property Office, the disclosure of which is incorporated by reference herein in its entirety.

TECHNICAL FIELD

The present disclosure relates in general to memory management, and more particularly, to a method and system for managing memory associated with a Peripheral Component Interconnect Express (PCIe) Solid-State Drive (SSD).

DISCUSSION OF RELATED ART

Non-Volatile Memory Express (NVMe) is an open, logical device interface specification for accessing a computer's non-volatile storage media which is usually attached via a Peripheral Component Interconnect Express (PCIe) bus. PCIe is a high-speed serial computer bus expansion standard. The NVMe is often a NAND flash memory which comes in several physical form factors such as, Solid-State Drive (SSD), PCIe SSD, and the like. The NVMe devices are available in standard sized PCIe expansion cards. The PCIe SSD is a high-speed expansion card which attaches to a computer.

The NVMe SSD may include Controller Memory Buffers (CMB), a Persistent Memory Region (PMR) and peer-to-peer (P2P) memory which are connected over the PCIe bus and used for computational storage. The CMB, PMR and P2P memory may be extra Dynamic Random-Access Memory (DRAM) which is a power protected and storage class memory.

When the NV-Me SSD memory is connected over the PCIe bus to perform read/write operation under control of a host computer, there may be a large amount of input/output overhead which reduces performance of the NVMe SSD. The input/output overhead is undesirable since the central processing unit (CPU) of the host computer must stall the operation while waiting for data to be loaded or unloaded from the NVMe SSD memory. The input/output overhead may be reduced by managing the NVMe SSD memory during the read/write operation.

Currently, there are many existing memory managers which manage the NVMe SSD memory during the read/write operation. These existing systems use memory allocation techniques such as, a genalloc/genpool, bitmap for allocating and de-allocation of the NVMe SSD memory. However, these existing memory managers do not provide an upper limit in memory allocation size and are unable to manage the NVMe SSD memory connected over the PCIe bus and reduce the input/output overhead created by the NVMe SSD memory.

SUMMARY

In an embodiment, the present disclosure provides a method for managing a memory associated with a Peripheral Component interconnect Express (PCIe) Solid-State Drive (SSD), the method including: generating, by a memory controller, a plurality of memory pools of equal size from a predefined size of contiguous physical memory associated with the PCIe SSD, wherein each of the plurality of memory pools manages a memory request of a different size, and wherein each of the plurality of memory pools is associated with a respective predefined size of memory request; dividing, by the memory controller, each of the plurality of memory pools into a first set of memory pages, wherein each of the first set of memory pages has a size equal to a maximum size among the predefined size of the memory request associated with the respective memory pool; dividing, by the memory controller, each of the first set of memory pages into a second set of memory pages, wherein each of the second set of memory pages has a size equal to the predefined size of the memory request associated with respective memory pool; and managing, by the memory controller, the contiguous physical memory associated with the PCIe SSD by allocating at least one memory page from the second set of memory pages for a memory request of a size corresponding to the size of the second set of memory pages.

In an embodiment, the present disclosure provides a memory controller for managing a memory associated with a PCIe SSD, the memory controller including: a processor configured to: generate a plurality of memory pools of equal size from a predefined size of contiguous physical memory associated with the PCIe SSD, wherein each of the plurality of memory pools manages a memory request of a different size, and wherein each of the plurality of memory pools is associated with a respective predefined size of memory request; divide each of the plurality of memory pools into a first set of memory pages, wherein each of the first set of memory pages is of a size equal to a maximum size among the predefined size of the memory request associated with the respective memory pool; divide each of the first set of memory pages into a second set of memory pages, wherein each of the second set of memory pages is of a size equal w the predefined size of the memory request associated with respective memory pool; and manage the contiguous physical memory associated with the PCIe SSD by allocating at least one memory page from the second set of memory pages for a memory request of a size corresponding to the size of the second set of memory pages.

BRIEF DESCRIPTION OF THE ACCOMPANYING DRAWINGS

The accompanying drawings, which are incorporated in and constitute a part of this disclosure, illustrate embodiments of the present disclosure and, together with the description, serve to explain the disclosed principles. The same numbers are used throughout the figures to reference like features and components. Some systems and/or methods in accordance with embodiments of the present subject matter are now described, by way of example, with regard to the accompanying figures, in which.

It should be appreciated by those skilled in the art that any block diagrams herein represent views of illustrative systems embodying the principles of the present subject matter. Similarly, it will be appreciated that any flow charts, flow diagrams, state transition diagrams, pseudo code, and the like, represent various processes which may be represented in a computer readable medium and executed by a computer or processor.

DETAILED DESCRIPTION OF THE EMBODIMENTS

While the disclosure is susceptible to various modifications and alternative forms, specific embodiments thereof are shown by way of example in the drawings and will be described in detail below. It should be understood, however that this is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof may cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof may cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

Figure 1A:
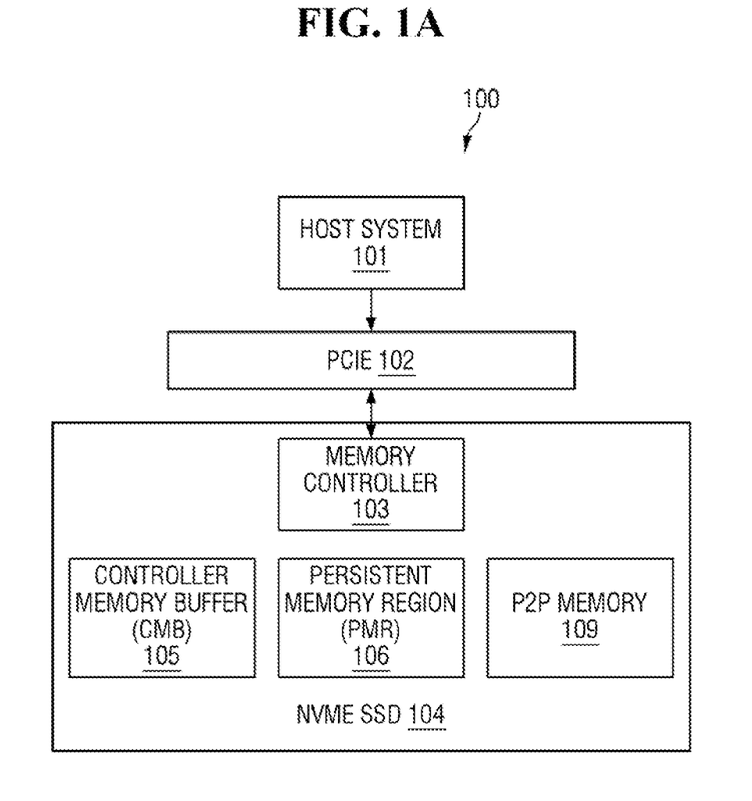
FIGS. 1A and 1B show environments for managing memory associated with Non-Volatile Memory Express (NVMe) Solid-State Drive (SSD) using a memory controller, in accordance with some embodiments of the present disclosure.
Figure 1B:
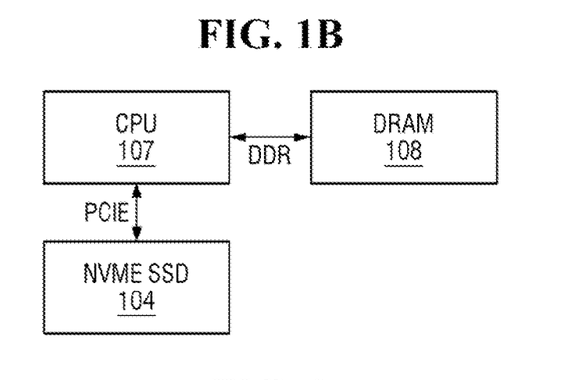

The present disclosure relates to a method and a memory controller for managing memory associated with Peripheral Component Interconnect Express (PCIe) Solid-State Drive (SSD), The memory controller manages the PCIe SSD memory by allocating memory pages of a size equal to a memory request. The memory controller divides the memory associated with the PCIe SSD into memory pools, a first set of memory pages and a second set of memory pages. The second set of memory pages is divided in such a manner that the memory controller assigns the second set of memory pages to manage memory requests of predefined sizes. Thus, the memory controller manages memory requests of different sizes for the PCIe SSD memory and reduces the input/output overhead created during allocating and de-allocating of the PCIe SSD memory, FIG. 1A shows an environment 100 for managing memory associated with PCIe SSD. The environment 100 includes a host system 101 and a NVMe SSD 104 connected to the host system 101 via PCIe 102. The NVMe SSD 104 comprises a memory controller 103 for managing memory associated with the NVMe SSD 104. The memory associated with the NVMe SSD 104 comprises a Controller Memory Buffer (CMB) 105, a Persistent Memory Region (PMR) 106 and a peer-to-peer (P2P) memory 109. The host system 101 may include, but is not limited to, a laptop computer, a desktop computer, a Personal Computer (PC), a notebook, a smartphone, a tablet, a server, a network server, a cloud-based server, and the like. In general, the host system 101 may require contiguous physical memory chunks for preparation of Physical Region Pages (PRPs) and Scatter Gather Lists (SGLs) to store/retrieve data from the NVMe SSD 104. The contiguous physical memory in the NVMe SSD 104 may include, but is not limited to, the CMB 105, the PMR 106, the P2P memory 109, and the like. The host system 101 comprises a central processing unit (CPU) 107 and a Dynamic Random-Access Memory (DRAM) 108 as shown in FIG. 1B. The CMB 105, the PMR 106, the P2P 109, and the like are connected over the PCIe 102 to perform read/write operations in response to the host system 101. The PCIe 102 is a high-speed serial computer expansion bus. In an embodiment of the present disclosure, the PCIe 102 is a common motherboard interface for a personal computer, graphic cards, a hard disk drive, SSDs and so on. The DRAM 108 of the host system 101 is used to store data which is to be processed or frequently needed by the CPU 107. The data can be read from and written to the DRAM quickly and allows the CPU 107 to remain idle while the CPU 107 waits for the data. In general, the CPU 107 of the host system 101 interacts with the DRAM 108 via Double Data Rate (DDR). Further, the memory controller 103 of the NVMe SSD 104 manages the contiguous physical memory, e.g., the CMB 105, the PMR 106 and the P2P memory 109 for a memory request to perform read/write operations under control of the host system 101.

Figure 2:
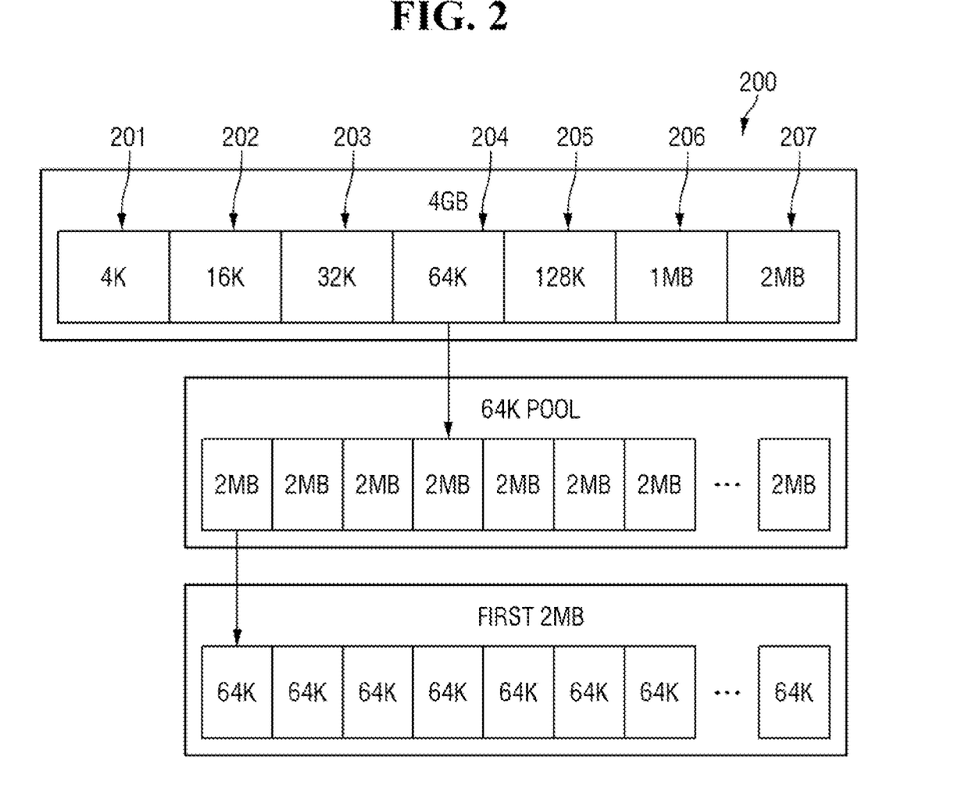
FIG. 2 illustrates a division of contiguous physical memory associated with a Peripheral Component Interconnect Express (PCIe) SSD into a second set of memory pages using a memory controller, in accordance with some embodiments of the present disclosure.

The memory controller 103 associated with the NVMe SSD 104 may generate a plurality of memory pools of equal size from a predefined size of contiguous physical memory, e.g., the CMB 105, the PMR 106, and the P2P memory 109. For example, the predefined size of the contiguous physical memory may be 4 Gigabytes (GB), which is required to perform one or more memory operations such as read/write operations. Each of the plurality of memory pools manages a memory request of a different size and each of the memory pools is associated with a respective predefined size of memory request. The predefined size of memory request for each of the plurality of memory pools is configured during compilation of one or more memory operations. Further, number of memory pools to be generated is configured during compilation of the one or more memory operations based on the predefined size of the contiguous physical memory associated with the NVMe SSD 104 also referred as the PCIe SSD. Upon generating the plurality of memo pools, the memory controller 103 divides each of the plurality of memory pools into a first set of memory pages, e.g., every memory pool is divided into a set of memory pages. For example, a first memory pool is divided into one set of memory pages, a second memory pool is divided into another set of memory pages, and so on. Further, each of the first set of memory pages is of a size equal to maximum size among the predefined sizes of memory requests Upon dividing the first set of memory pages, the memory controller 103 divides each of the first set of memory pages into a second set of memory pages. Each of the second set of memory pages is of a size equal to the predefined size of the memory request associated with the respective memory pool. The memory controller 103 manages the contiguous physical memory associated with the NVMe SSD 104 by allocating at least one memory page from the second set of memory pages for a memory request of a size corresponding to the size of the second set of memory pages. For example, FIG. 2 illustrates a division of the contiguous physical memory into a second set of memory pages. Consider the contiguous physical memory 200 is of a size 4 GB. The memory controller 103 divides the 4 GB contiguous physical memory into multiple memory pools based on size. For example, during compilation of the read/write operation, the contiguous physical memory is divided into, for example, seven memory pools of equal size. Thus, the 4 GB memory is divided into seven memory pools each having a size of 584 Megabytes (MB). Further, each of the memory pools is configured to manage a memory request of a predefined size, e.g., for example, first memory pool 201 may be configured to manage a memory request of a size of 4 k, a second memory pool 202 may be configured to manage a memory request of a size of 16 k, a third memory pool 203 may be configured to manage a memory request of a size of 32 k, fourth memory pool 204 may be configured to manage a memory request of a size of 64 k, a fifth memory pool 205 may be configured to manage a memory request of a size of 128 k, a sixth memory pool 206 may be configured to manage a memory request of a size of 1 MB, and a seventh memory pool 207 may be configured to manage a memory request of a size of 2 MB. In current example as shown in FIG. 2, the last memory pool, e.g., the seventh memory pool 207, is configured to manage a memory request of 2 MB. Thus, maximum memory request size which the contiguous physical memory is configured to manage is 2 MB. Upon dividing the contiguous physical memory into the number of memory pools, the memory controller 103 divides each memory pool into the first set of memory pages of a size equal to a maximum memory request. Consider in FIG. 2, the memory pool configured for a 64 k memory request is divided into the first set of memory pages, wherein each page is of a size of 2 MB since the maximum memory request size is 2 MB. Thus, each of the memory pools of the size of 584 MB is divided into 292 first set of memory pages of size 2 MB. Further, each of the first set of memory pages is divided by the memory controller 103 into the second set of memory pages of a size equal to the predefined size of the memory request associated with respective memory pool. For example, in FIG. 2, the first set of memory pages is divided into 32 second set of memory pages each having a size of 64 k since the memory pool is configured to manage memory request of size 64 k. Similarly, as another example, the first memory pool 201 configured for the 4 k memory request comprises 512 second set of memory pages each with a size 4 k. The second memory pool 202 configured for the 16 k memory request comprises 128 second set of memory pages each with a size 16 k and so on. Further, the memory controller 103 allocates the second set of memory pages to manage memory requests of a different size by maintaining a free list and an allocation list for each of the plurality of memory pools.

Figure 3A:
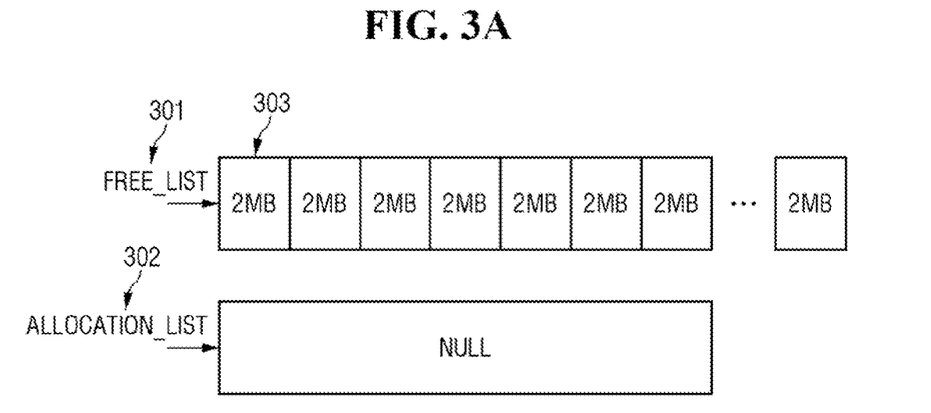
FIGS. 3A, 3B and 3C show techniques for managing contiguous physical memory by allocating and de-allocating memory pages, in accordance with some embodiments of present disclosure.
Figure 3B:
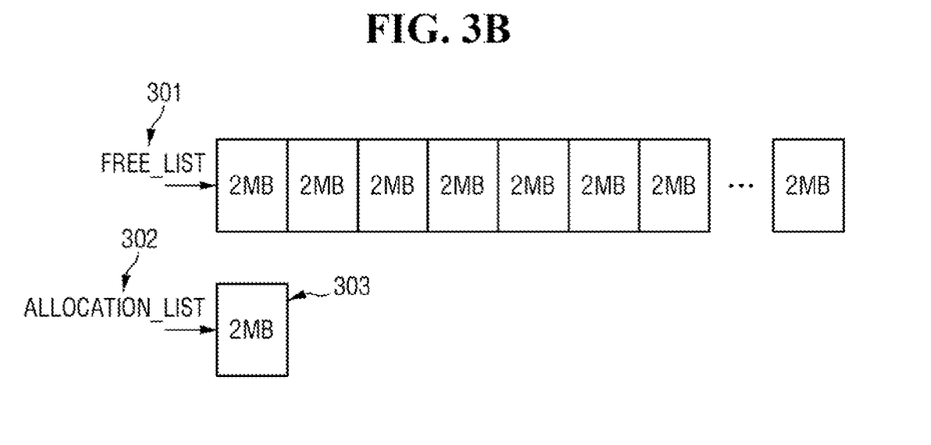
Figure 3C:
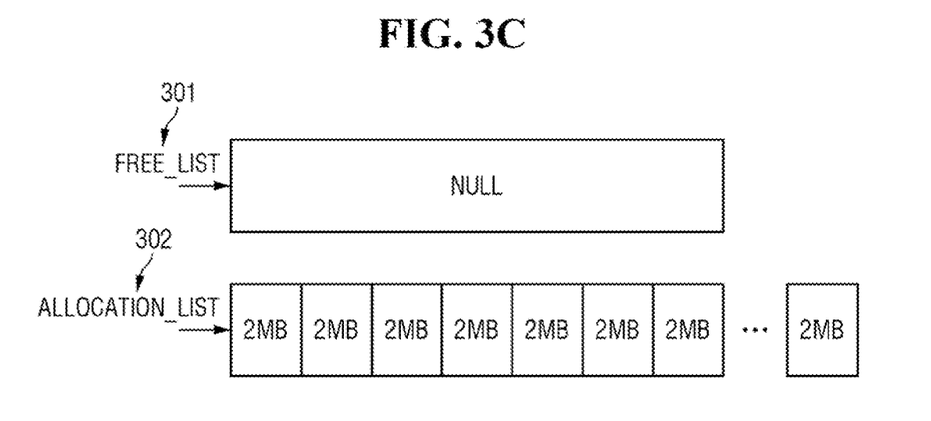

FIGS. 3A, 3B and 3C show example embodiments for managing the contiguous physical memory by allocating and de-allocating memory pages from second set of memory pages. The memory controller 103 maintains the free list and the allocation list for each of the plurality of memory pools to allocate and de-allocate the second set of memory pages. The free list and the allocation list are associated with the first set of memory pages within each of the respective memory pool. For example, FIG. 3A shows a free list 301 and an allocation list 302 associated with the memory pool configured to manage a memory request of 64 k. The free list 301 includes the first set of memory pages associated with respective second set of memory pages. The first set of memory pages remain in the free list 301 since the respective second set of memory pages are not allocated by the memory controller 103. The allocation list 302 is initially empty/null when the second set of memory pages are not allocated for the read/write operations.

For example, consider a memory request of 64 k is received from a user to perform a read/write operation. The memory controller 103 allocates memory pages from the second set of memory pages to perform the read/write operation. For instance, a first memory page from the second set of memory pages is initialized at index zero, the next memory page (or second memory page) is initialized at index one, the next memory page (a third memory page) is indexed at two, and so on. The memory controller 103 starts allocating the memory pages from the second set of memory pages. In an embodiment of the present disclosure, the memory controller 103 allocates the second set of memory pages to a user space for performing the read/write operation. The user space is a portion of memory containing processes run by the user. In an embodiment of the present disclosure, the memory controller 103 provides an encrypted kernel virtual address to the user space for performing the read/write operation. The kernel virtual address is similar to a logical address where mapping is done from a kernel-space address to a physical address. Consider the above example of FIG. 2, where the 64 k memory pools comprises 32 second set of memory pages. Consider that all the 32 second set of memory pages with the size of 64 k are allocated for the read/write operation. In such a scenario, the memory controller 103 shifts respective first set of memory pages to the allocation list 302. FIG. 3B, shows that a first memory page 303 of the first set of memory pages is shifted to the allocation list 302 once all of the respective second set of memory pages are allocated for the read/write operation. Similarly, once all of the second set of memory pages are allocated, the respective first set of memory pages is moved to the allocation list 302 and the free list 301 is empty/null as indicated in FIG. 3c. Further, once the read/write operation is completed, the memory controller 103 de-allocates the second set of memory pages associated with the memory request. Consider the same example as above, in this case, the memory controller 103 de-allocates the 64 k second set of memory pages as the read/write operation is completed. Upon de-allocating the second set of memory pages, the memory controller 103 shifts each of the first set of memory pages to the free list 304 and the allocation list 302 is empty/null again.

In an embodiment of the present disclosure, consider that the second set of memory pages allocated for The 64 k memory request is insufficient for performing the read/write operation. In such a scenario, the memory controller 103 may identify if each of the memory pages from the second set of memory pages associated with the 64 k memory request is allocated. Upon identifying whether each of the memory pages is allocated, the memory controller 103 obtains a first set of memory pages from a memory pool associated with a memory request of a maximum size among the predefined sizes of memory requests. For example, the memory controller 103 obtains a first set of memory pages from the memory pool configured to manage a memory request of 2 MB. Upon obtaining the first set of memory pages, the memory controller 103 changes the size of the second set of memory pages associated with the obtained first set of memory pages. The size of the second set of memory pages associated with the obtained first set of memory pages is changed to the size of the second set of memory pages associated with the memory request. For example, the memory controller 103 obtains the first set of memory pages of the size of 2 MB which includes one second set of memory pages of the size of 2 MB. The memory controller 103 changes the 2 MB size of the second set of memory pages into 32 second set of memory pages of 64 k size. Further, the memory controller 103 allocates the second set of memory pages to satisfy the memory request of 64 k and completes the read/write operation. For instance, if there are no free first set of memory pages of size 2 MB in the memory pool configured to manage the memory request of 2 MB, the memory controller 103 obtains the first set of memory pages from a next smaller size memory pool, for example, a 1 MB memory pool, in present scenario. Similarly, consider that the 1 MB memory pool contains no free first set of memory pages, the memory controller 103 obtains the first set of memory pages from the next smaller size memory pool, e.g., the 128 k memory pool and so on. The memory controller 103 continues a search to obtain the first set of memory pages of size 2 MB until the memory controller 103 satisfies the memory request of 64 k size and completes the read/write operation.

Figure 4:
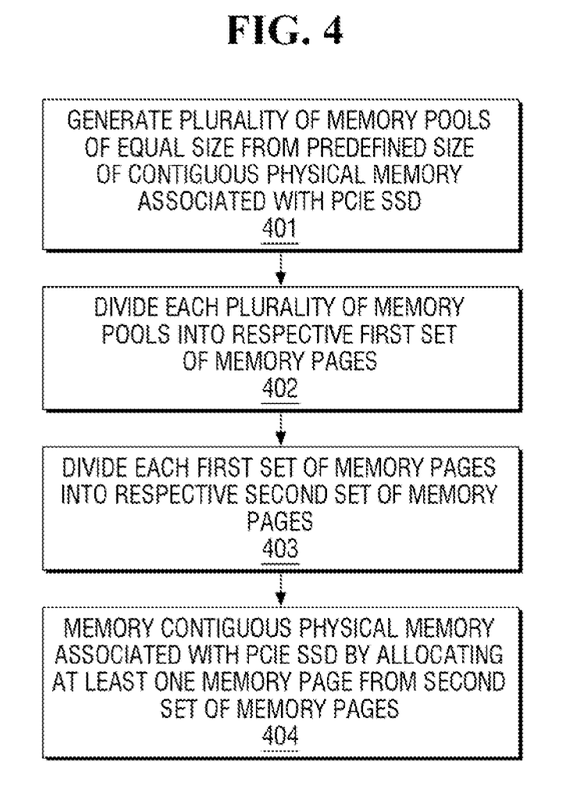
FIG. 4 illustrates a flowchart showing a method for managing memory associated with PCIe SSD, in accordance with some embodiments of present disclosure.

FIG. 4 illustrates a flowchart showing a method for managing memory associated with PCIe SSD, in accordance with some embodiments of present disclosure.

As illustrated in FIG. 4, the method 408 may comprise one or more steps. The method may be described in the context of computer executable instructions. Computer executable instructions can include routines, programs, objects, components, data structures, procedures, modules, and functions, which perform particular functions or implement particular abstract data types.

The order in which the method is described is not intended to be limiting, and any number of the described method blocks can be combined in any order to implement the method. Additionally, individual blocks may be deleted from the method or methods. Furthermore, the method can be implemented in any suitable hardware, software, firmware, or combination thereof.

At block 401, the memory controller 103 generates the plurality of memory pools of equal size from the predefined size of contiguous physical memory associated with the PCIe SSD. Each of the plurality of memory pools manages a memory request of a different size and each of the plurality of memory pools is associated with a respective predefined size of memory request. The predefined size of memory request for each of the plurality of memory pools is configured during compilation of one or more memory operations. Similarly, number of memory pools is configured during compilation of the one or more memory operations based on the predefined size of the contiguous physical memory associated with the PCIe SSD.

At block 402, each of the plurality of memory pools is divided by the memory controller 103 into respective first set of memory pages. Each of the first set of memory pages is of a size equal to maximum size among the predefined sizes of memory requests.

At block 403, each of the first set of memory pages is divided by the memory controller 103 into respective second set of memory pages. Each of the second set of memory pages is of a size equal to the predefined size of the memory request associated with respective memory pool.

At block 404, the contiguous physical memory associated with the PCIe SSD is managed by the memory controller 103 by allocating at least one memory page from the second set of memory pages for a memory request of a size corresponding to the size of the second set of memory pages.

Particularly, each of the plurality of memory pools maintains an allocation list and a free list associated with the first set of memory pages within each of the respective memory pools, Upon allocating, a respective second set of memory pages for the memory request, the memory controller 103 shifts each of the first set of memory pages to the allocation list. Further, upon completion of the one or more memory operations, the second set of memory pages associated with the memory request are de-allocated by the memory controller 103. Upon de-allocating, each of the first set of memory pages is shifted to the free list by the memory controller 103.

An embodiment of the present disclosure provisions a method for managing memories associated with PCIe SSD by dividing the memory into pools which are configured to manage memory requests of different size.

An embodiment of the present disclosure reduces the allocation and de-allocation time as the memory is divided to manage the predefined size of memory requests.

An embodiment of the present disclosure reduces a security threat by proving an encrypted kernel virtual address to a user space during allocation of the second set of memory pages.

The terms "an embodiment", "embodiment", "embodiments", "the embodiment", "the embodiments", "one or more embodiments", "some embodiments", and "one embodiment" may mean "one or more (but not all) embodiments of the present disclosure" unless expressly specified otherwise.

The terms "including", "comprising", "having" and variations thereof may mean "including but not limited to", unless expressly specified otherwise.

The enumerated listing of items does not imply that any or all of the items are mutually exclusive, unless expressly specified otherwise.

The terms "a", "an" and "the" may mean "one or more", unless expressly specified otherwise.

A description of an embodiment with several components in communication with each other does not imply that all such components are required. For example, a variety of optional components are described to illustrate the wide variety of possible embodiments of the present disclosure.

When a single device or article is described herein, it will be readily apparent that more than one device/article (whether or not they cooperate) may be used in place of the single device/article. Similarly, where more than one device or article is described herein (whether or not they cooperate), it will be readily apparent that a single device/article may be used in place of the more than one device or article, or a different number of devices/articles may be used instead of the more than one device or article. The functionality and/or the features of a device may be alternatively embodied by one or more other devices which are not explicitly described as having such functionality/features. Thus, other embodiments of the present disclosure need not include the device itself.

The illustrated operations of FIG. 4 shows certain events occurring in a certain order, in alternative embodiments of the present disclosure, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

We claim:

1. A method for managing a memory associated with a Peripheral Component Interconnect Express (PCIe) Solid-State Drive (SSD), the method comprising:
   generating, by a memory controller, a plurality of memory pools of equal size from a predefined size of contiguous physical memory associated with the PCIe SSD, wherein each of the plurality of memory pools manages a memory request of a different size, and wherein each of the plurality of memory pools is associated with a respective predefined size of memory request;
   dividing, by the memory controller, each of the plurality of memory pools into a first set of memory pages, wherein each of the first set of memory pages has a size equal to a maximum size among the predefined size of the memory request associated with the respective memory pool;
   dividing, lay the memory controller, each of the first set of memory pages into a second set of memory pages, wherein each of the second set of memory pages has a size equal to the predefined size of the memory request associated with respective memory pool; and
   managing, by the memory controller, the contiguous physical memory associated with the PCIe SSD by allocating at least one memory page from the second set of memory pages for a memory request of a size corresponding to the size of the second set of memory pages.

2. The method as claimed in claim 1, wherein the predefined size of the memory request for each of the plurality of memory pools is configured during compilation of one or more memory operations.

3. The method as claimed in claim 1, wherein number of memory pools is configured during compilation of one or more memory operations based on the predefined size of the contiguous physical memory associated with the PCIe SSD.

4. The method as claimed in claim 1, wherein allocating at least one memory page from the second set of memory pages comprises:
   maintaining, by the memory controller, for each of the plurality of memory pools an allocation list and a free list associated with the first set of memory pages within each of the memory pools; and
   shifting, by the memory controller, each of the first set of memory pages to the allocation list, upon allocating each of the second set of memory pages for the memory request.

5. The method as claimed in claim 4, further comprising:
   de-allocating, by the memory controller, the second set of memory pages associated with the memory request; and
   shifting, by the memory controller, each of the first set of memory, pages to the free list, upon de-allocating the second set of memory pages associated with the memory request.

6. The method as claimed in claim 1, further comprising:
   identifying, by the memory controller, if each memory page from the second set of memory pages associated with the memory request is allocated;
   obtaining, by the memory controller, a first set of memory pages from a memory pool associated with a memory request of a maximum size among the predefined sizes of memory requests; and
   changing, by the memory controller, a size of second set of memory pages associated with the obtained first set of memory pages, wherein the size of the second set of memory pages associated with the obtained first set of memory pages is changed to the size of the second set of memory pages associated with the memory request.

7. A memory controller for managing a memory associated with a Peripheral Component Interconnect Express (PCIe) Solid-State Drive (SSD), comprising:
   a processor configured to:
   generate a plurality of memory pools of equal size from a predefined size of contiguous physical memory associated with the PCIe SSD, wherein each of the plurality of memory pools manages a memory request of a different size, and wherein each of the plurality of memory pools is associated with a respective predefined size of memory request;
   divide each of the plurality of memory pools into a first set of memory pages, wherein each of the first set of memory pages is of a size equal to a maximum size among the predefined size of the memory request associated with the respective memory pool;
   divide each of the first set of memory pages into a second set of memory pages, wherein each of the second set of memory pages is of a size equal to the predefined size of the memory request associated with respective memory pool; and
   manage the contiguous physical memory associated with the PCIe SSD by allocating at least one memory page from the second set of memory pages for a memory request of a size corresponding to the size of the second set of memory pages.

8. The memory controller as claimed in claim 7, wherein the predefined size of the memory request for each of the plurality of memory pools is configured during compilation of one or more memory operations.

9. The memory controller as claimed in claim 7, wherein number of memory pools is configured during compilation of one or more memory operations based on the predefined size of the contiguous physical memory associated with the PCIe SSD.

10. The memory controller as claimed in claim 7, wherein the processor allocates at least one memory page from the second set of memory pages by:
    maintaining for each of the plurality of memory pools an allocation list and a free list associated with the first set of memory pages within each of the memory pools; and
    shifting each of the first set of memory pages to the allocation list, upon allocating each of the second set of memory pages for the memory request.

11. The memory controller as claimed in claim 10, wherein the processor:
    de-allocates the second set of memory pages associated with the memory request; and
    shifts each of the first set of memory pages to the free list, upon de-allocating the second set of memory pages associated with the memory request.

12. The memory controller as claimed in claim 7, wherein the processor:
    identities if each memory page from the second set of memory pages associated with the memory request is allocated;
    obtains a first set of memory pages from a memory pool associated with a memory request of a maximum size among the predefined sizes of memory requests; and
    changes a size of the second set of memory pages associated with the obtained first set of memory pages, wherein the size of the second set of memory pages associated with the obtained first set of memory pages is changed to the size of the second set of memory pages associated with the memory request.

13. A method for managing a memory associated with a Peripheral Component Interconnect Express (PCIe) Solid-State Drive (SSD), the method comprising:
generating a plurality of memory pools from a memory, wherein each of the memory pools has the same size;
dividing each of the memory pools into a first set of memory pages, wherein each memory page of the first set of memory pages has a size equal to a maximum size of a memory request for the all of the memory pools;
dividing each memory page of the first set of memory pages into a second set of memory pages, wherein each memory page of the second set of memory pages has a size equal to a size of a memory request associated with its respective memory pool; and
allocating at least one memory page from the second set of memory pages in response to a read/write operation having a size corresponding to the size of the second set of memory pages.

14. The method of claim 13, wherein each of the memory pools is configured to manage a memory request of a different size.

15. The method of claim 13, further comprising maintaining a free list and an allocation list for each of the memory pools, wherein the free list includes the first set of memory pages fir its respective memory pool.

16. The method of claim 15, wherein the allocation list is empty prior to the second set of memory pages being allocated in response to the read/write operation.

17. The method of claim 15, further comprising shifting a memory page of the first set of memory pages to the allocation list when all of the memory pages from the second set of memory pages are allocated.

18. The method of claim 17, wherein the free list is empty once all of the memory pages from the second set of memory pages are allocated and the first set of memory pages is moved to the allocation list.

19. The method of claim 13, further comprising de-allocating the second set of memory pages associated with the read/write operation once the read/write operation is completed.

20. The method of claim 13, wherein when the second set of memory pages allocated for the read/write operation is insufficient, the method further comprises obtaining a first set of memory pages from a memory pool associated with the memory request of the maximum size, changing the size of the second set of memory pages associated with the obtained first set of memory pages, and allocating the obtained second set of memory pages to complete the read/write operation.

* * * * *